(12) United States Patent
Zhao et al.

(10) Patent No.: US 9,445,390 B2
(45) Date of Patent: Sep. 13, 2016

(54) METHOD AND NODE FOR POSITIONING IN COMBINED CELL

(71) Applicant: TELEFONAKTIEBOLAGET L M ERICSSON (PUBL), Stockholm (SE)

(72) Inventors: Yufeng Zhao, Upplands Väsby (SE); Åke Busin, Sollentuna (SE); Tomas Tilver, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/434,788

(22) PCT Filed: Oct. 10, 2012

(86) PCT No.: PCT/SE2012/051086
§ 371 (c)(1),
(2) Date: Apr. 10, 2015

(87) PCT Pub. No.: WO2014/058363
PCT Pub. Date: Apr. 17, 2014

(65) Prior Publication Data
US 2015/0282114 A1   Oct. 1, 2015

(51) Int. Cl.
*H04W 24/00* (2009.01)
*H04W 64/00* (2009.01)
*H04L 5/00* (2006.01)
*H04W 16/18* (2009.01)
*H04W 16/24* (2009.01)
(Continued)

(52) U.S. Cl.
CPC .......... *H04W 64/003* (2013.01); *H04L 5/0048* (2013.01); *H04W 16/18* (2013.01); *H04W 16/24* (2013.01); *H04W 64/00* (2013.01); *H04W 72/0453* (2013.01); *G01S 5/10* (2013.01); *H04W 88/08* (2013.01)

(58) Field of Classification Search
CPC ............. H04W 64/003; H04W 16/18; H04W 72/0453; H04W 16/24; H04W 88/08; H04W 64/00; H04L 5/0048; G01S 5/10
USPC ............ 455/404.2, 412.1–414.2, 418–422.1, 455/456.1, 456.2, 457; 370/328–332, 338
See application file for complete search history.

(56) References Cited

U.S. PATENT DOCUMENTS 8,682,389 B2 * 3/2014 Siomina ................ H04W 64/00
455/456.5
9,258,718 B2 * 2/2016 Ji .......................... H04W 24/02
(Continued)

FOREIGN PATENT DOCUMENTS

CN   WO 2011060720 A1 *   5/2011   ............ H04W 64/00
EP   2023504 A2           2/2009
(Continued)

*Primary Examiner* — Babar Sarwar

(57) ABSTRACT

A method in a first radio base station of a wireless communication system, for transmitting a reference signal for positioning in a cell. The cell is hosted by the first radio base station and served by a plurality of transmission points. Each transmission point is associated with a value of a first attribute indicating whether transmission of the reference signal for positioning is enabled for the associated transmission point. The method comprises selecting at least one transmission point among the plurality of transmission points based on the values of the first attribute, and transmitting the reference signal for positioning in the cell from the selected at least one transmission point only.

12 Claims, 10 Drawing Sheets

(51) Int. Cl.
*H04W 72/04* (2009.01)
*G01S 5/10* (2006.01)
*H04W 88/08* (2009.01)

(56) References Cited

U.S. PATENT DOCUMENTS

| | | | |
|---|---|---|---|
| 2005/0277425 A1* | 12/2005 | Niemela | H04W 52/40 455/452.2 |
| 2008/0274753 A1* | 11/2008 | Attar | G01S 5/0205 455/456.6 |
| 2010/0317343 A1* | 12/2010 | Krishnamurthy | G01S 1/30 455/435.1 |
| 2011/0105144 A1 | 5/2011 | Siomina et al. | |
| 2011/0230144 A1 | 9/2011 | Siomina et al. | |
| 2012/0040696 A1 | 2/2012 | Siomina et al. | |
| 2012/0108270 A1* | 5/2012 | Kazmi | H04W 64/00 455/456.5 |
| 2012/0214528 A1 | 8/2012 | Hashimoto | |
| 2012/0231809 A1* | 9/2012 | Siomina | H04W 64/00 455/456.1 |
| 2013/0194931 A1* | 8/2013 | Lee | H04L 5/0053 370/241 |
| 2014/0035782 A1* | 2/2014 | Fischer | G01S 19/06 342/357.43 |

FOREIGN PATENT DOCUMENTS

| | | | | |
|---|---|---|---|---|
| JP | 2023504 A2 * | 2/2009 | | H04B 7/061 |
| SE | WO 2011139201 A1 * | 11/2011 | | H04W 64/00 |
| SE | WO 2012108802 A1 * | 8/2012 | | H04L 5/0058 |
| WO | 2011/060720 A1 | 5/2011 | | |
| WO | 2011/139201 A1 | 11/2011 | | |
| WO | 2012/108802 A1 | 8/2012 | | |
| WO | 2012116007 A1 | 8/2012 | | |

* cited by examiner

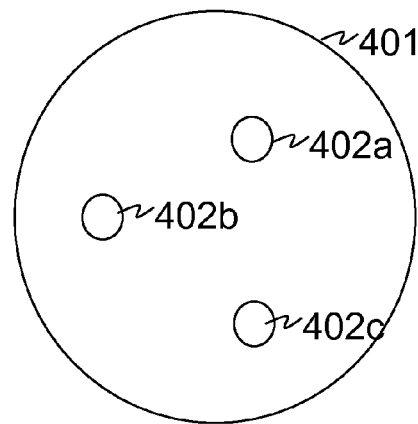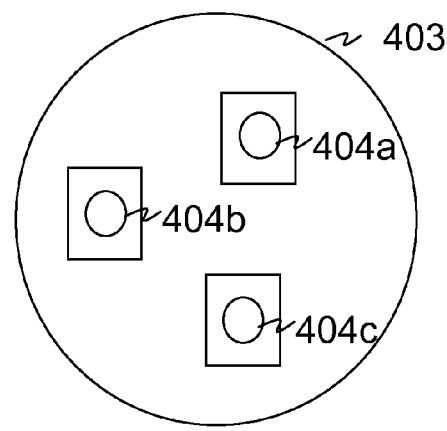
Fig. 4a    Fig. 4b
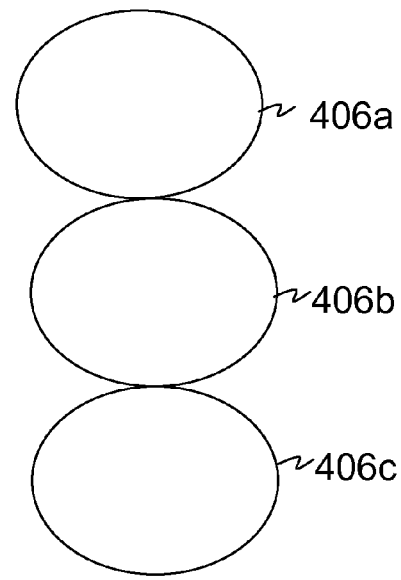
Fig. 4c    Fig. 4d

METHOD AND NODE FOR POSITIONING IN COMBINED CELL

This application is a 371 of International Application PCT/SE2012/051086, filed Oct. 10, 2012, the disclosure of which is fully incorporated herein by reference.

TECHNICAL FIELD

The disclosure relates to transmission of reference signals for positioning, and more specifically to a radio base station of a wireless communication system and a method in the radio base station for transmitting a reference signal for positioning in a cell hosted by the radio base station and served by a plurality of transmission points.

BACKGROUND

3GPP Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a wireless device such as a User Equipment (UE) is wirelessly connected to a Radio Base Station (RBS) commonly referred to as an evolved NodeB (eNodeB) in LTE. An RBS is a general term for a radio network node capable of transmitting radio signals to a UE and receiving signals transmitted by a UE. The eNodeB is a logical node in LTE and the RBS is a typical example of a physical implementation of an eNodeB.

FIG. 1 illustrates a conventional radio access network in an LTE system. An eNodeB 101a with a transmission point 102a serves a UE 103 located within the eNodeB's geographical area of service also called a cell 105a. The eNodeB 101a is directly connected to the core network (not illustrated). The eNodeB 101a is also connected via an X2 interface to a neighboring eNodeB 101b with a transmission point 102b serving another cell 105b.

The use of a so called heterogeneous deployment or heterogeneous network consisting of radio network nodes transmitting with different transmit power and operating within overlapping coverage areas, is an interesting deployment strategy for cellular networks. In such a deployment schematically illustrated in FIG. 2a, low-power nodes such as pico nodes 210 are typically assumed to offer high data rates measured in Mbit/s, as well as to provide high capacity e.g. measured in users/m2 or in Mbit/s/m2, in the local areas where this is needed or desired. High-power nodes, often referred to as macro nodes 220, are assumed to provide full-area coverage. Pico nodes and macro nodes may also be referred to as pico RBSs and macro RBSs respectively.

In a traditional heterogeneous deployment, schematically illustrated in FIG. 2b, a macro node 220 creates a macro cell 221 and each pico node 210 creates a cell of its own, a so called pico cell 211. This means that, in addition to downlink and uplink data transmission and reception on the pico link 213 maintained between the pico node 210 and the wireless device 212, the pico node 210 also transmits the full set of common signals and channels associated with a cell. In an LTE context this includes the primary and secondary synchronization signals, Cell-specific Reference Signals (CRS), and system information (SI) related to the cell, in FIG. 2b referred to as SI pico and illustrated by a cell with a dashed line overlying the pico cell 211.

In an alternative to the deployment illustrated in FIG. 2b, a terminal or wireless device 212 in the range of a pico node 210, i.e. in the subarea 214 covered by the pico node, may be simultaneously connected to both a macro node 220 and the pico node 210 as illustrated in FIG. 2c. To the macro node 220, covering the area 222, the terminal 212 maintains a connection or link, e.g. used for radio-resource control (RRC) such as mobility. Furthermore, the terminal 212 maintains a connection or link to the pico node 210, used primarily for data transmission. This approach may be referred to as a combined cell or soft cell approach. In the following it will be referred to as the combined cell approach. The SI related to the combined cell is in FIG. 2c referred to as SI and is illustrated by a cell with a dashed line overlying the area 222.

The distinction between cell and transmission points is an important aspect of the combined cell approach. Each cell has a unique cell identity from which the CRS is derived. With the cell identity information, a terminal can derive the CRS structure of the cell and obtain the SI it needs to access the network. A transmission point on the other hand is mainly one or more collocated antennas from which a terminal can receive data transmissions in a certain area. As a conclusion, a cell may be deployed with one or several antennas or transmission points covering the cell area. In the latter case, the cell is thus served by a plurality of transmission points where each transmission point covers an area of the cell, hereinafter also referred to as a sector of the cell.

Mobile user positioning is the process of determining UE coordinates in space. Once the coordinates are available, the position can be mapped to a certain place or location. There exist a variety of positioning techniques in wireless communications networks, differing in their accuracy, implementation cost, complexity, and applicability in different environments.

Observed Time Difference of Arrival (OTDOA) is a positioning method defined by 3GPP for LTE which exploits a multi-lateration technique to calculate the UE position based on Time Difference of Arrival (TDOA) measurements from three or more locations. To enable positioning, the UE should thus be able to detect signals from at least three geographically dispersed RBSs. This implies that the signals need to have high enough signal-to-interference ratios. Furthermore, the signals need to be transmitted frequently enough to meet the service delay requirements.

OTDOA positioning is using Reference Signal Time Difference (RSTD) measurements as specified in the 3GPP standard i.e. the relative timing difference between the timing of a neighbour cell and a reference cell. It has been shown that using synchronization signals (SS) and CRS for positioning without interference management, results in positioning coverage problems due to low SINR and/or insufficient number of strong signals from different RBS. To address these issues and enhance positioning measurements, Positioning Reference Signals (PRS) have been introduced. PRS are transmitted in downlink according to a predefined PRS pattern. This implies that the UE needs to know what PRS pattern that is used for a certain cell, in order for it to be able to detect the PRS and perform the positioning measurements needed for the positioning services.

The principle of the OTDOA positioning method in a conventional E-UTRAN such as the one illustrated in FIG. 1, is schematically illustrated in FIG. 3a. The cells 305a-c has one single transmission (Tx) point each 302a-c from which the PRS is sent. The Tx points 302a-c are equivalent to the transmission antenna(s). For the case where there are multiple antennas for one Tx point, the spatial separation is still limited and the antennas can be defined by one point. The position of a UE 303 is estimated by measuring RSTD of the different PRS sent from the different surrounding cells' Tx points 302a-c respectively. The timing of the PRS transmissions are synchronized to a common time source. With knowledge of the transmission time, the Tx point location and the measured RSTDs, a positioning function can estimate the position of the UE 303 by hyperbolic trilateration.

However, when moving to a cell deployment that has multiple Tx points within one cell, such as in the combined cell deployment in FIG. 2c, the OTDOA method will not work as wanted. The reason is that the OTDOA positioning method assumes a single Tx point per cell. The Tx points must be spatially unique as ambiguities will otherwise occur in the trilateration calculations, as illustrated in FIG. 3b. Two of the cells 305a-b have one Tx point each 302a-b. However, one of the cells 305c has two geographically separated Tx points 302c and 302d. As these two Tx points 302c-d belong to the same cell 305c, they transmit the same PRS. The UE 303 will therefore measure two different RSTD for the cell 305c which will cause an ambiguous positioning estimate.

SUMMARY

It is therefore an object to address some of the problems outlined above, and to provide a solution making it possible to accurately locate a wireless device in a network deploying cells with multiple transmission points using a positioning method relying on TDOA measurements. This object and others are achieved by the method and the RBS according to the independent claims, and by the embodiments according to the dependent claims.

In accordance with a first aspect of the invention, a method in a first radio base station of a wireless communication system, for transmitting a reference signal for positioning in a cell is provided. The cell is hosted by the first radio base station and served by a plurality of transmission points. Each transmission point is associated with a value of a first attribute indicating whether transmission of the reference signal for positioning is enabled for the associated transmission point. The method comprises selecting at least one transmission point among the plurality of transmission points based on the values of the first attribute, and transmitting the reference signal for positioning in the cell from the selected at least one transmission point only.

In accordance with a second aspect of the invention, a first RBS of a wireless communication system is provided. The first RBS is configured to transmit a reference signal for positioning in a cell hosted by the first radio base station and served by a plurality of transmission points. Each transmission point is associated with a value of a first attribute indicating whether transmission of the reference signal for positioning is enabled for the associated transmission point. The first radio base station comprises a processing circuit configured to select at least one transmission point among the plurality of transmission points based on the values of the first attribute, and a transmitter configured to transmit the reference signal for positioning in the cell from the selected at least one transmission point only.

An advantage of embodiments is that a degradation of positioning performance is avoided in deployment scenarios where a cell has multiple transmission points A further advantage of embodiments is that the solution may be implemented and operated in a network at a low cost.

Other objects, advantages and features of embodiments will be explained in the following detailed description when considered in conjunction with the accompanying drawings and claims.

BRIEF DESCRIPTION OF THE DRAWINGS

FIGS. 4a-d are schematic illustrations of some scenarios for combined cells.

DETAILED DESCRIPTION

Figure 1:
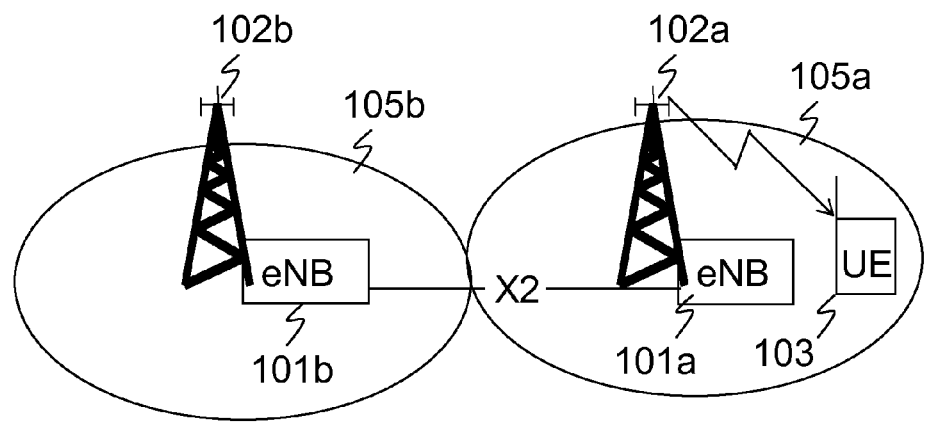
FIG. 1 is a schematic illustration of a radio access network in LTE.
Figure 2A:
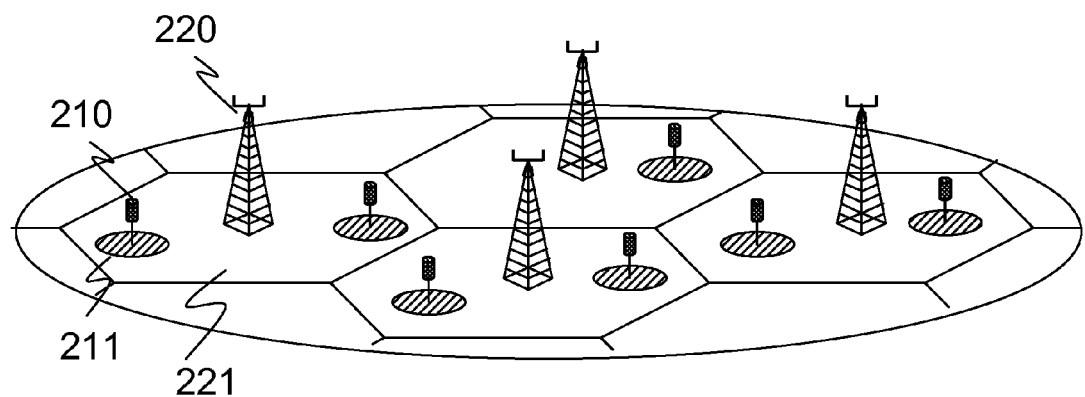
FIG. 2a is a schematic illustration of a heterogeneous network deployment.
Figure 2B:
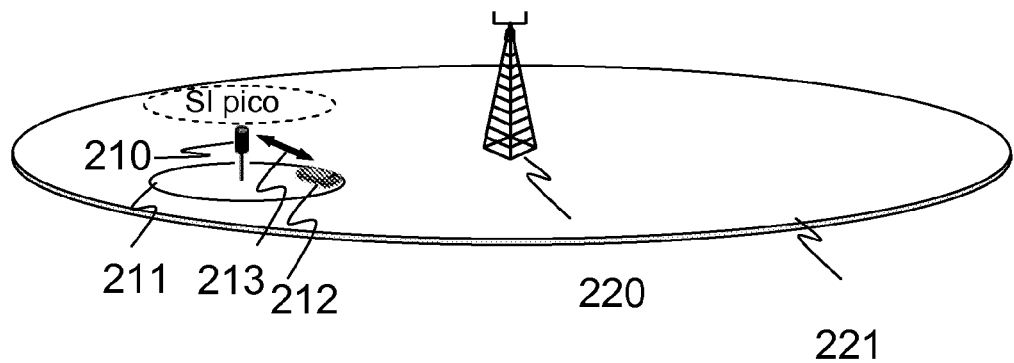
FIG. 2b is a schematic illustration of a traditional macro and pico cell deployment.
Figure 2C:
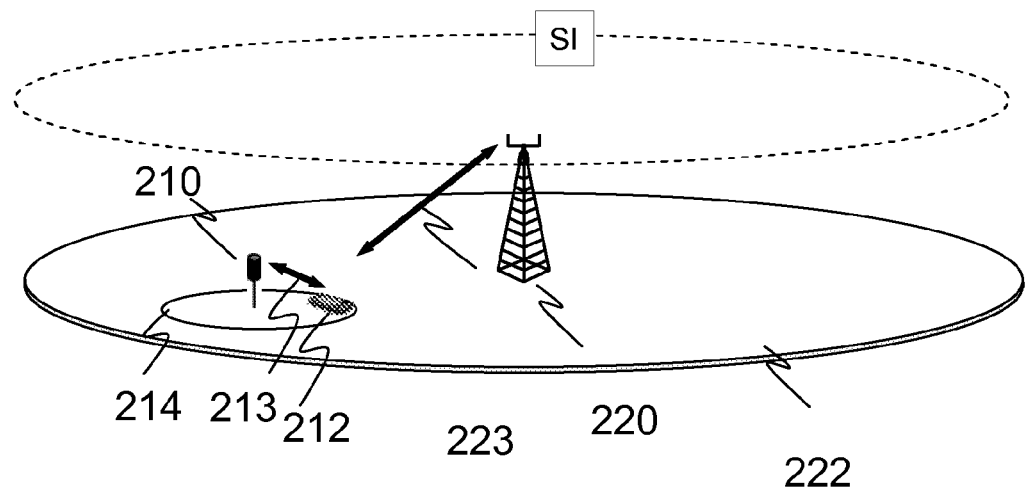
FIG. 2c is a schematic illustration of the combined cell approach.
Figure 3A:
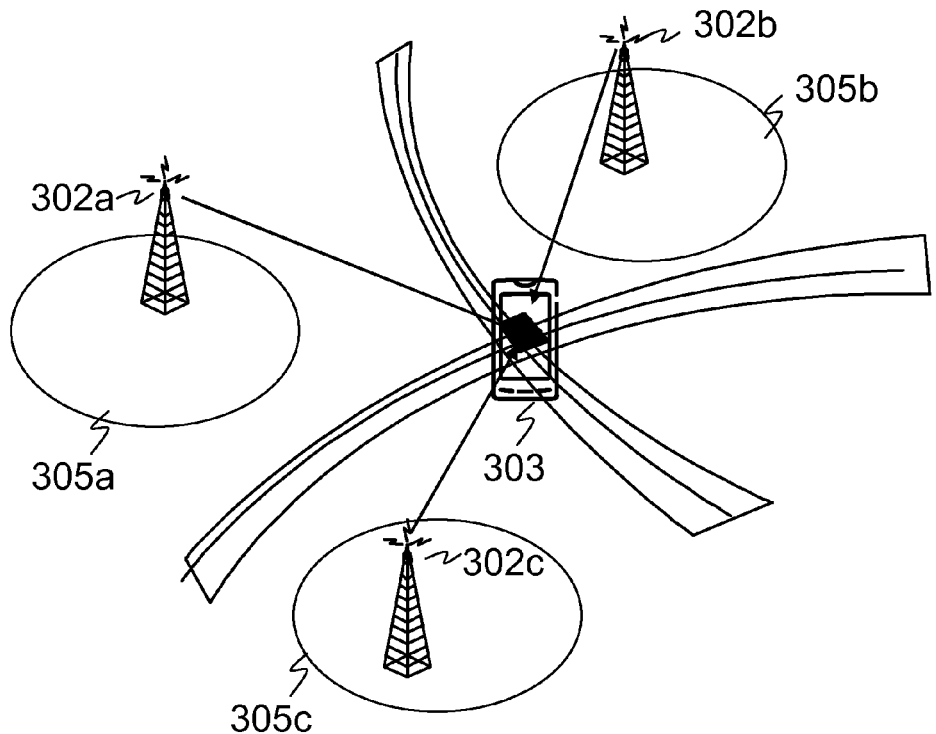
FIGS. 3a-b are schematic illustrations of the OTDOA principle.
Figure 3B:
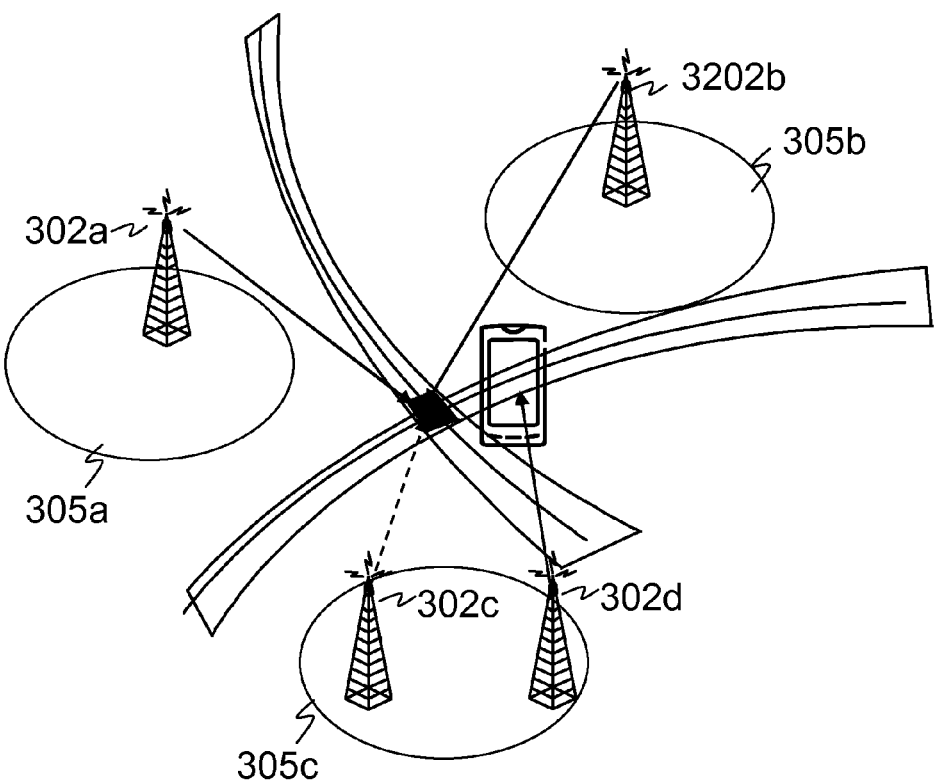

In the following, different aspects will be described in more detail with references to certain embodiments of the invention and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while embodiments of the invention are primarily described in the form of methods and nodes, they may also be embodied in a computer program product as well as in a system comprising a computer processor and a memory coupled to the processor, wherein the memory is encoded with one or more programs that may perform the functions disclosed herein.

Embodiments are described in a non-limiting general context in relation to an example scenario with OTDOA positioning in E-UTRAN, where the OTDOA measurements are made based on PRS transmitted from the cells. However, it should be noted that the embodiments may be applied to any radio access network technology supporting positioning measurements based on cell unique reference signals for positioning.

The problem of inconsistent RSTD measurements resulting in ambiguous positioning estimates for a wireless device in a network deploying cells with multiple Tx points is addressed by a solution where it is possible to configure a cell with multiple Tx points in an eNodeB, such that the PRSs are sent only from one selected Tx point, or from a subset of selected Tc points. Unambiguous PRS based positioning of UEs will in this way be possible also in e.g. a combined cell deployment, without changing the principles of the OTDOA positioning method.

As already described above, a cell with multiple Tx points is called a combined cell. A combined cell can be seen as consisting of a set of sectors, where each sector is associated with one Tx point. According to embodiments of the invention, it is configurable if a Tx point of a combined cell transmits PRSs or not. The PRS transmission may thus be disabled in certain Tx points of a combined cell if the transmission of PRS from such Tx points will decrease the positioning accuracy. In most cases this will allow for an unambiguous position estimate also for combined cells.

FIGS. 4a-d illustrates some foreseen scenarios for combined cells, to exemplify in what scenarios a disabling of certain cells' PRS transmissions may be advantageous with regards to positioning performance. In the figures a circle or an oval illustrates a sector corresponding to one Tx point of the cell.

FIG. 4a illustrates a macro sector 401 with several overlapping pico sectors 402a-c. In this case, the macro sector 401 covers the whole area of the cell. If a same PRS is transmitted from both macro sector 401 and pico sectors 402, the measurement of this PRS received from both the macro sector Tx point and one or more of the pico sector Tx points will cause large positioning errors. Therefore, the PRS shall be configured to be sent only from the Tx point of the macro sector 401.

FIG. 4b illustrates a macro sector 403 with several deep indoor pico sectors 404a-c. In this case the macro sector 403 will not fully cover the pico sectors 404a-c and the PRS from the macro sector may not be detected by a UE located in the area of one of the pico sectors. However, the problem is the same as in FIG. 4a if PRS is transmitted from all sector Tx points of the cell. Therefore, the PRS shall be configured to be sent only from the Tx point of the macro sector 403.

FIG. 4c illustrates a cell with closely located pico sectors 405a-c as e.g in a building with one sector per floor. The separation of the sectors will only cause acceptable error relative to e.g. measurement and timing error. Therefore PRS shall be configured to be sent from the Tx points of all the pico sectors 405a-c.

FIG. 4d illustrates a cell deployed with macro sectors 406a-c with a significant geographical separation. Such a deployment may e.g. be used for covering a railway track. The separation of the sectors may cause large positioning errors if
PRS is transmitted from the Tx points of all macro sectors 406a-c. PRS may therefore be configured to be sent from the Tx point of only one of the sectors e.g. the middle one 406b. As PRS has better hearability than other reference signals it may probably anyhow be detectable in parts of the other sectors 406a and 406c.

Figure 5A:
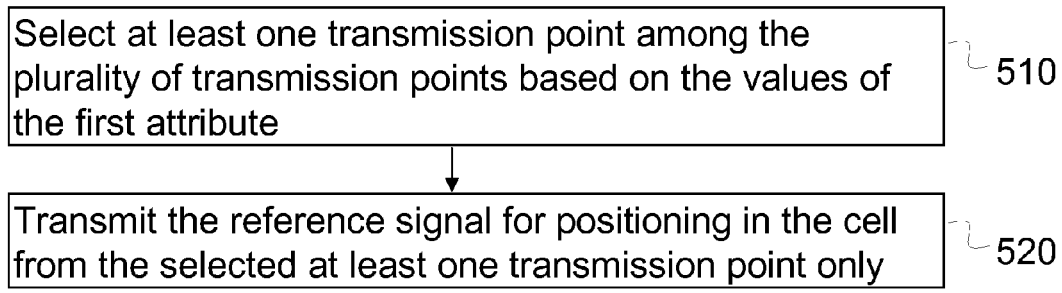
FIGS. 5a-b are flowcharts illustrating the method in the first RBS according to embodiments.

FIG. 5a is a flowchart illustrating a method in a first RBS of a wireless communication system, for transmitting a reference signal for positioning in a cell. The reference signal may e.g. be the PRS, and the first RBS may be an eNodeB of an E-UTRAN. The cell is hosted by the first RBS and is served by a plurality of Tx points. Each Tx point is associated with a value of a first attribute indicating whether transmission of the reference signal for positioning is enabled for the associated Tx point. The method comprises:
  510: Selecting at least one Tx point among the plurality of Tx points based on the values of the first attribute.
  520: Transmitting the reference signal for positioning in the cell from the selected at least one Tx point only.

The advantage of the method is that as it is configurable if a Tx point should transmit PRS in a cell, not all Tx points of the cell need to transmit PRS which makes it possible to use OTDOA positioning in a network using combined cell deployments.

Figure 6A:
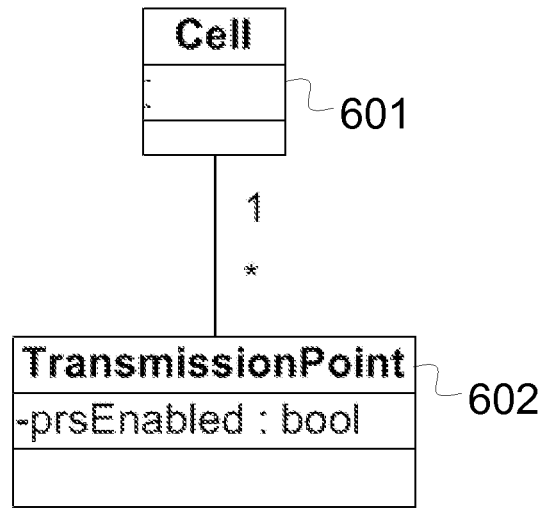
FIGS. 6a-b schematically illustrate the managed objects modeling a cell and a Tx point according to embodiments.

In a first embodiment of the invention, the value of the first attribute is configured for each of the plurality of Tx points at setup of the cell. The operator may thus, when setting up a cell with multiple Tx points, configure if the PRS shall be transmitted or not for a certain Tx point, e.g. in accordance with the choices described above with reference to the deployment scenarios in FIGS. 4a-d. In one example embodiment, the first attribute is a Boolean (bool) attribute named prsEnabled. The prsEnabled attribute is configured for each Tx point of a cell, as illustrated by the managed object model in FIG. 6a modeling the cell with one object 601 related to one or more Tx point objects 602. The relation one-to-many between the cell and the Tx points is visualized by the 1 and the * between the objects 601 and 602 of the model. The value of prsEnabled is configured to true for a Tx point that should transmit PRS and to false for a Tx point that should not transmit PRS in the cell. When the cell is unlocked and taken into service, the eNodeB serving the cell will select one or more of the Tx points of the cell with the attribute prsEnabled set to true, and will transmit PRS from the selected Tx points only, in accordance with the method described above with reference to FIG. 5a. In a deployment according to FIG. 4a described above, only the Tx point of the macro sector will be configured with prsEnabled set to true, which will thus be the only Tx point transmitting PRS.

Figure 7A:
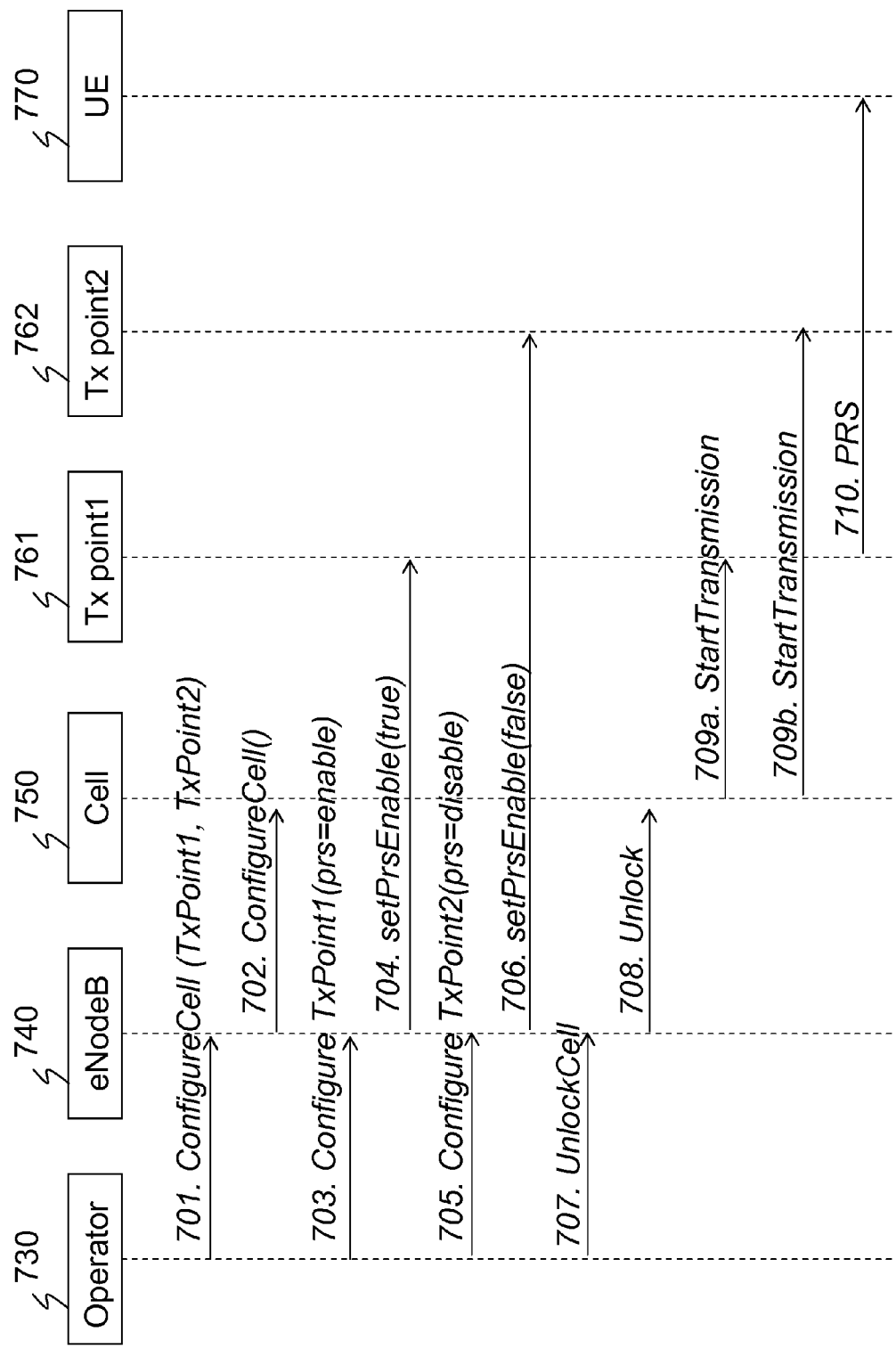
FIGS. 7a-c are signaling diagrams illustrating a configuration of a cell according to different embodiments.

FIG. 7a is a signaling diagram illustrating an example of a configuration of a cell 750 in an eNodeB 740 according to the first embodiment. In the example the cell has two Tx points, 761, 762:
  701: The operator 730 sends the configuration command ConfigureCell to the eNodeB 740 for the configuration of the cell 750. In the command the operator 730 indicates the Tx points to use, that is the first TxPoint 761 and the second TxPoint 762.
  702: The eNodeB 740 is triggered to configure the cell 750 (ConfigureCell( )).
  703: The operator 730 sends the configuration command Configure TxPoint for the first Tx point 761 to the eNodeB 740. In the command the operator 730 indicates the value of the prsEnable attribute; in this case the value true is indicated meaning that this Tx point 761 shall be transmitting PRS.
  704: The eNodeB 740 is triggered to set the attribute value in the Tx point 761 (setPrsEnable(true)).
  705: The operator 730 sends the configuration command Configure TxPoint for the second Tx point 762 to the eNodeB 740. In the command the operator 730 indicates the value of the prsEnable attribute; in this case the value false is indicated meaning that this Tx point 761 shall not be transmitting PRS.
  706: The eNodeB 740 is triggered to set the attribute value in the Tx point 762 (setPrsEnable(false)).

The steps for unlocking the cell after the configuration is finished are also illustrated:
  707: The operator 730 sends the unlock command unlockCell to the eNodeB 740 for unlocking the cell 750 to take it into operation.
  708: The eNodeB 740 is triggered to unlock the cell 750.
  709a and 709b: The cell 750 is triggered to indicate transmission start to the two Tx points 761, 762 (start Transmission).

710: As only the first Tx point 761 has an attribute prsEnabled that indicates that it should send PRS, it is only this Tx point 761 that will transmit PRS to the UE 770.

Figure 5B:
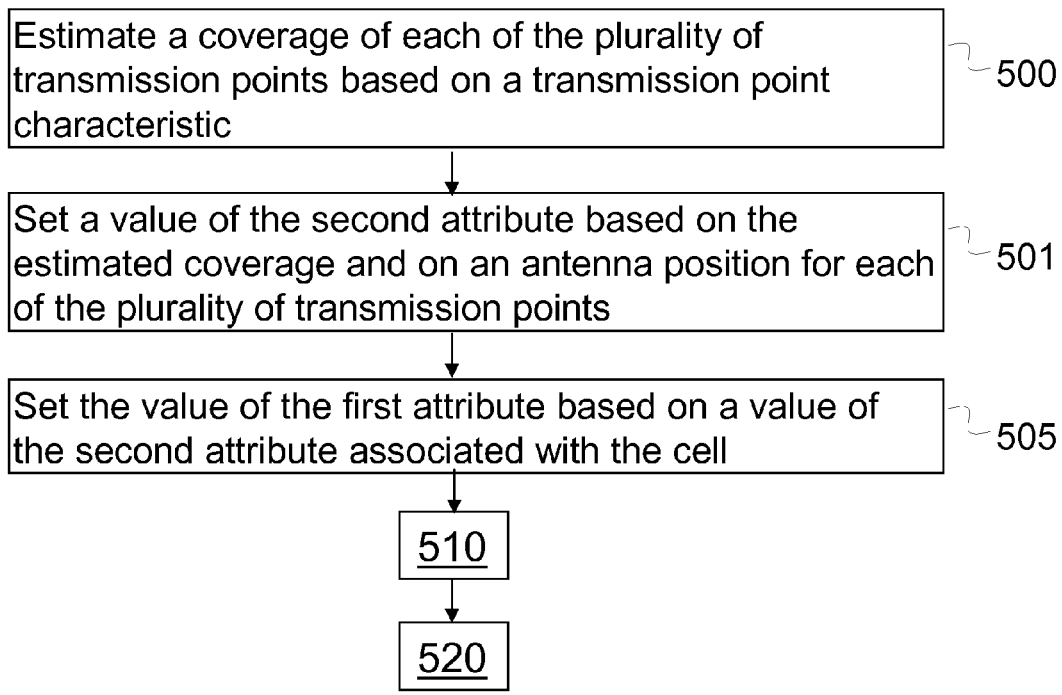

According to a second embodiment, alternative to the first embodiment described above and schematically illustrated in the flow chart in FIG. 5*b*, the method comprises, in addition to step 510 and 520 already described above with reference to FIG. 5*a*:

505: Setting the value of the first attribute for each of the plurality of Tx points based on a value of a second attribute associated with the cell. The value of the second attribute indicates a type of the cell. The value of the first attribute may be set based also on a maximum transmission power and/or an antenna position of each of the plurality of Tx points.

Figure 6B:
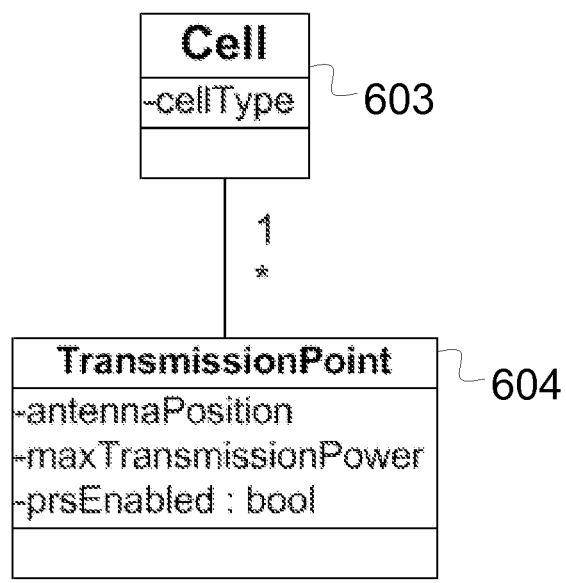

In one example of the second embodiment, the first attribute is the Boolean attribute named prsEnabled, which is associated with each Tx point of the cell as already described above. In addition to the first attribute, a second attribute associated with the cell is introduced. The second attribute indicates a type of the cell and is therefore named cellType in this example. This is illustrated in the managed object model in FIG. 6*b* modeling the cell with one object 603 comprising the attribute cellType. The cell objet 603 is related to one or more Tx point objects 604 comprising the attribute prsEnabled:bool. Based on the value of the cellType attribute in the cell, and possibly also based on the value of the attribute antennaPosition indicating the antenna position of the Tx point and/or based on the value of the attribute maxTransmissionPower indicating the maximum transmission power of the Tx point, the eNodeB can make a decision whether the Tx point should be sending PRS or not, and set the first attribute prsEnabled accordingly.

When the second attribute cellType indicates that the cell type is a macro/pico type of cell, corresponding to the cells described with reference to FIGS. 4*a-b* above, the eNodeB may e.g. set the first attribute prsEnabled to true for the Tx point with the highest value of the maxTransmissionPower attribute.

When the second attribute cellType indicates that the cell type is a type of cell corresponding to the cells described with reference to FIG. 4*c* above, the eNodeB may set the first attribute prsEnabled to true for all the Tx points.

When the second attribute cellType indicates that the cell type is a type of cell corresponding to the cells described with reference to FIG. 4*d* above, the eNodeB may set the first attribute prsEnabled to true for the Tx point where the antennaPosition attribute value indicates that it is the middle Tx point.

In a third embodiment of the invention which may be combined with the second embodiment described above, the value of the second attribute is configured at setup of the cell. The additional advantage of the third embodiment compared to the first embodiment described above, is that the operator only needs to configure one attribute for the cell, i.e. the cellType attribute, when setting up the cell, instead of configuring one attribute for each Tx point, i.e. the prsEnabled attribute. This will make the configuration less complex and reduce the configuration time, which is due to a higher degree of self-configuration of the eNodeB.

Figure 7B:
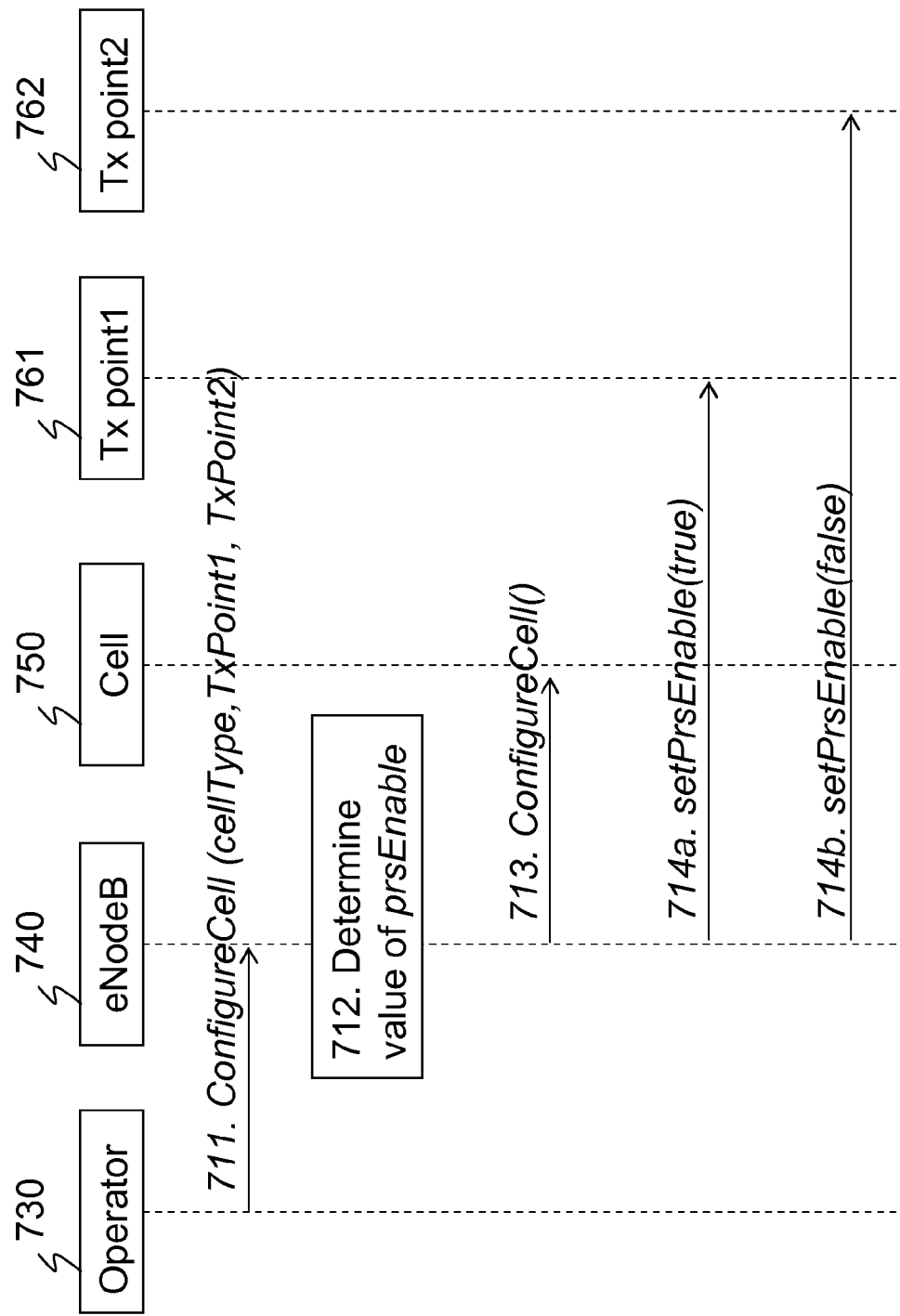

FIG. 7*b* is a signaling diagram illustrating an example of a configuration of a cell 750 in an eNodeB 740 according to the third embodiment. In the example the cell 750 has two Tx points, 761, 762:

711: The operator 730 sends the configuration command Configure Cell to the eNodeB 740 for the configuration of the cell 750. In the command the operator 730 indicates the Tx points to use, that is the first TxPoint 761 and the second TxPoint 762, as well as the cellType attribute value.

712: The eNodeB 740 is triggered to determine a value of the prsEnable attribute for the two Tx points. It is determined that the first Tx point 761 should have prsEnable=true, and the second Tx point 762 should have prsEnable=false.

713: The eNodeB 740 is triggered to configure the cell 750 (ConfigureCell( )).

714*a*, 714*b*: The eNodeB 740 sets the first attribute value in the two Tx points 761, 762 (setPrsEnable(true/false)), according to what was determined in step 712 above.

The steps for unlocking the cell after the configuration is finished, although not illustrated in this case, are the same as described above with reference to FIG. 7*a*.

In a fourth embodiment, which is an alternative to the third embodiment, also illustrated in FIG. 5*b*, the method further comprises:

500: Estimating a coverage of each of the plurality of Tx points based on at least one of the following Tx point characteristics: a carrier frequency; a maximum transmission power; an antenna height; and a path loss.

501: Setting the value of the second attribute based on the estimated coverage and on an antenna position for each of the plurality of Tx points.

In this fourth embodiment, also the cellType attribute is set by the RBS based on characteristics related to the Tx points of the cell. The estimated coverage of the cell together with the antenna positions given by the value of the antennaPosition attribute, may be used to determine the deployment of the cell and the value of the cellType attribute can thus be set. The advantage is that there is no need for extra input from the operator, as the RBS itself determines and sets both the first and the second attributes. The coverage estimation may be done in a way similar to how a cell coverage dimensioning is done. In a cell coverage dimensioning, the coverage requirement is that a certain bit rate must be reached within the coverage area. The input parameters are RBS transmission power, assumed UE power, bandwidth, and frequency band. The cell or sector coverage may be expressed as a signal attenuation, typically a median signal attenuation at the cell border. The coverage estimation is performed by starting with a low value of signal attenuation and increasing the value until the coverage requirement cannot be met any longer. The last value will thus give the estimated coverage.

Figure 7C:
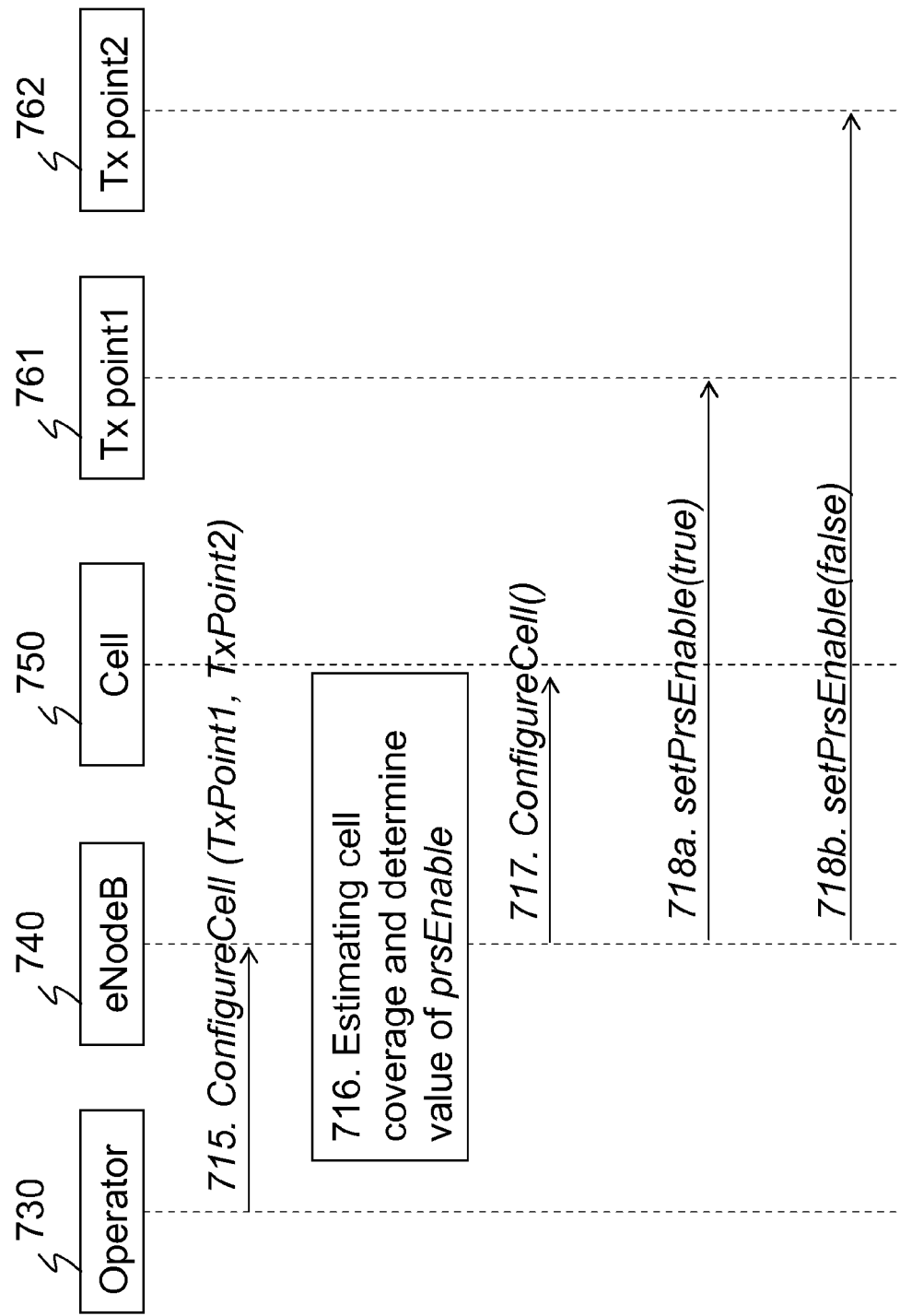

FIG. 7*c* is a signaling diagram illustrating an example of a configuration of a cell 750 in an eNodeB 740 according to the fourth embodiment. In the example the cell 750 has two Tx points, 761, 762:

715: The operator 730 sends the configuration command Configure Cell to the eNodeB 740 for the configuration of the cell 750. In the command the operator 730 indicates the Tx points to use, that is the first TxPoint 761 and the second TxPoint 762. However, no cellType attribute value is needed in this embodiment.

716: The eNodeB 740 is triggered to estimate a cell coverage and to determine the value of the cellType attribute based on the cell coverage estimation and antenna positions. Based on the value of the cellType attribute, the eNodeB then determines a value of the prsEnable attribute for the two Tx points in analogy with the description above with reference to FIG. 7*b*. It is thus determined that the first Tx point 761 should have prsEnable=true, and the second Tx point 762 should have prsEnable=false.

717: The eNodeB 740 is triggered to configure the cell 750 (ConfigureCell( )).

718a, 718b: The eNodeB 740 sets the first attribute value in the two Tx points 761, 762 (setPrsEnable(true/false)), according to what was determined in step 716 above.

The steps for unlocking the cell after the configuration is finished, although not illustrated in this case, are the same as described above with reference to FIG. 7a.

In one embodiment of the invention, which may be combined with any of the second, third or fourth embodiments described above, at least one of the plurality of Tx points is managed by a second RBS. In this case, setting 105 the value of the first attribute for each of the plurality of Tx points comprises:

Setting the value of the first attribute for each of the plurality of Tx points managed by the first RBS.

Transmitting a request to the second RBS to set the value of the first attribute for each of the plurality of Tx points managed by the second RBS.

Although the cell is hosted by the first RBS, some of the cells transmissions points may be managed by a second RBS, and a request for setting the first attribute value must therefore be sent to the second RBS managing these Tx points for a complete configuration of the cell and its Tx points.

Figure 8:
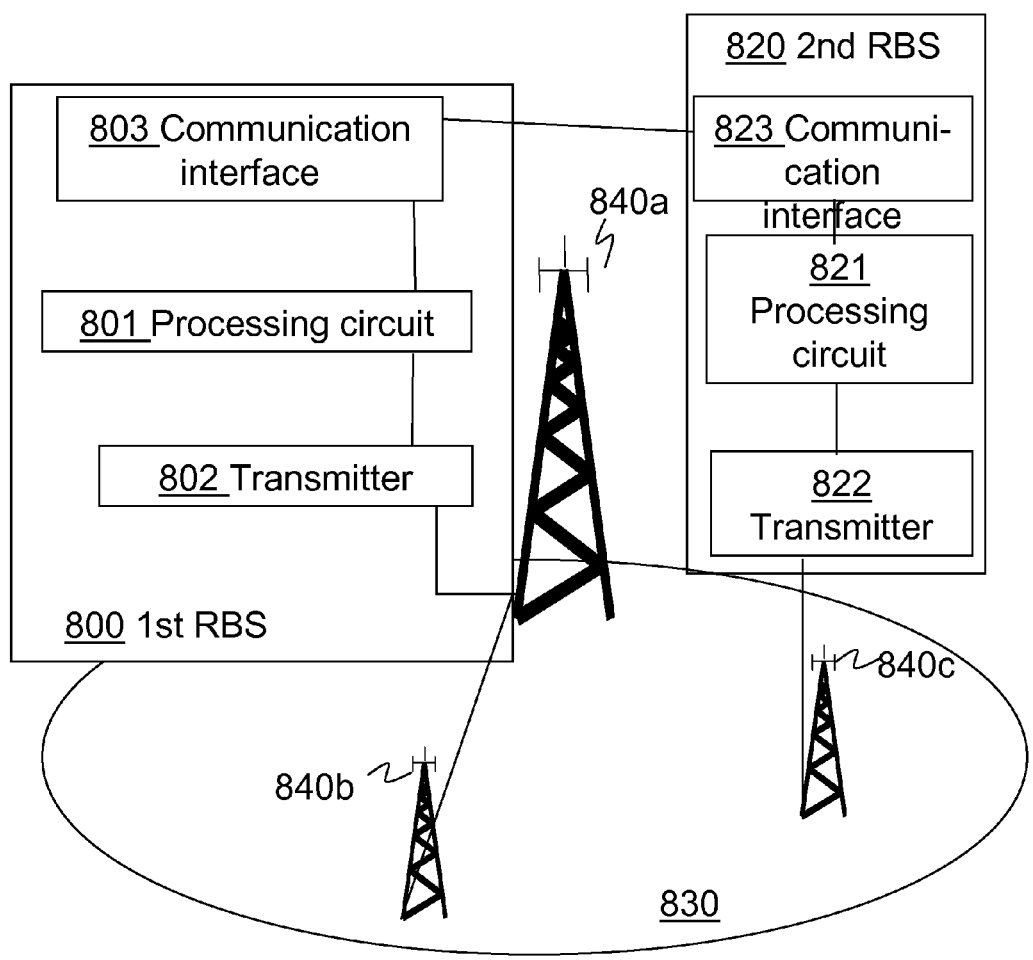
FIG. 8 is a block diagram schematically illustrating the RBS according to embodiments.

A first RBS 800 of a wireless communication system is schematically illustrated in the block diagram in FIG. 8. The first RBS 800 is configured to transmit a reference signal for positioning in a cell 830. The cell is hosted by the first RBS and served by a plurality of Tx points, 840a, 840b, 840c. Each Tx point is associated with a value of a first attribute indicating whether transmission of the reference signal for positioning is enabled for the associated Tx point. The first RBS comprises a processing circuit 801 configured to select at least one Tx point among the plurality of Tx points based on the values of the first attribute. The first RBS also comprises a transmitter 802 configured to transmit the reference signal for positioning in the cell from the selected at least one Tx point only.

According to the first embodiment, the value of the first attribute is configured for each of the plurality of Tx points at setup of the cell.

According to the second embodiment, the processing circuit 801 is further configured to set the value of the first attribute for each of the plurality of Tx points based on a value of a second attribute associated with the cell. The value of the second attribute indicates a type of the cell. The processing circuit 801 may be configured to set the value of the first attribute based also on at least one of a maximum transmission power and an antenna position of each of the plurality of Tx points.

According to the third embodiment, the value of the second attribute is configured at setup of the cell.

According to the fourth embodiment, the processing circuit 801 is further configured to estimate a coverage of each of the plurality of Tx points based on at least one of the following Tx point characteristics: a carrier frequency; a maximum transmission power; an antenna height; and a path loss. Furthermore, the processing circuit 801 is configured to set the value of the second attribute based on the estimated coverage and on an antenna position for each of the plurality of Tx points.

In one embodiment of the invention, which may be combined with any of the second, third or fourth embodiments, at least one of the plurality of Tx points is configured to be managed by a second RBS. The first RBS further comprises a communication interface 803 to the second RBS. The processing interface 801 is configured to set the value of the first attribute for each of the plurality of Tx points by being configured to set the value of the first attribute for each of the plurality of Tx points managed by the first RBS, and to transmit a request to the second RBS via the communication interface 803. The transmitted request is a request to set the value of the first attribute for each of the plurality of Tx points managed by the second RBS. FIG. 8 also illustrates the second RBS 820, managing one of the Tx points 840c. Also this second RBS comprises a processing circuit 821, a transmitter 822, and a communication interface 823. Furthermore, both the first and the second RBS typically comprises a receiver, although not illustrated in the figure.

In an alternative way to describe the embodiments in FIG. 8, the first RBS 800 comprises a Central Processing Unit (CPU) which may be a single unit or a plurality of units. Furthermore, the first RBS 800 comprises at least one computer program product (CPP) in the form of a non-volatile memory, e.g. an EEPROM (Electrically Erasable Programmable Read-Only Memory), a flash memory or a disk drive. The CPP comprises a computer program, which in turn comprises code means which when run on the first RBS causes the CPU to perform steps of the procedure described earlier in conjunction with FIGS. 5a-b. In other words, when said code means are run on the CPU, they correspond to the processing circuit 801 in the first RBS 800 of FIG. 8.

The above mentioned and described embodiments are only given as examples and should not be limiting. Other solutions, uses, objectives, and functions within the scope of the accompanying patent claims may be possible.

The invention claimed is:

1. A method in a first radio base station of a wireless communication system, for transmitting a reference signal for positioning in a cell hosted by the first radio base station and served by a plurality of transmission points, the method comprising:

associating each transmission point with a value of a first attribute of a managed object indicating whether transmission of the reference signal for positioning is enabled for the associated transmission point;

selecting at least one transmission point among the plurality of transmission points based on the values of the first attribute;

transmitting the reference signal for positioning in the cell from the selected at least one transmission point only; and setting the value of the first attribute for each of the plurality of transmission points based on a value of a second attribute of the managed object associated with the cell, wherein the value of the second attribute indicates a type of the cell.

2. The method according to claim 1, wherein the value of the first attribute is configured for each of the plurality of transmission points at setup of the cell.

3. The method according to claim 1, wherein the value of the first attribute is set based also on at least one of a maximum transmission power or an antenna position of each of the plurality of transmission points.

4. The method according to claim 1, wherein the value of the second attribute is configured at setup of the cell.

5. The method according to claim 1, further comprising: estimating a coverage of each of the plurality of transmission points based on at least one of the following transmission point characteristics: a carrier frequency, a maximum transmission power, an antenna height, or a path loss; and setting the value of the second attribute based on the estimated coverage and on an antenna position for each of the plurality of transmission points.

6. The method according to claim 1, wherein at least one of the plurality of transmission points is managed by a second radio base station, and wherein setting the value of the first attribute for each of the plurality of transmission points comprises:

setting the value of the first attribute for each of the plurality of transmission points managed by the first radio base station; and transmitting a request to the second radio base station to set the value of the first attribute for each of the plurality of transmission points managed by the second radio base station.

7. A first radio base station of a wireless communication system, configured to transmit a reference signal for positioning in a cell hosted by the first radio base station and served by a plurality of transmission points, the first radio base station comprising:

a processing circuit configured to:
associate each transmission point with a value of a first attribute of a managed object indicating whether transmission of the reference signal for positioning is enabled for the associated transmission point;
select at least one transmission point among the plurality of transmission points based on the values of the first attribute;

a transmitter configured to transmit the reference signal for positioning in the cell from the selected at least one transmission point only; and wherein the processing circuit is further configured to set the value of the first attribute for each of the plurality of transmission points based on a value of a second attribute of the managed object associated with the cell, wherein the value of the second attribute indicates a type of the cell.

8. The first radio base station according to claim 7, wherein the value of the first attribute is configured for each of the plurality of transmission points at setup of the cell.

9. The first radio base station according to claim 7, wherein the processing circuit is configured to set the value of the first attribute based also on at least one of a maximum transmission power or an antenna position of each of the plurality of transmission points.

10. The first radio base station according to claim 7, wherein the value of the second attribute is configured at setup of the cell.

11. The first radio base station according to claim 7, wherein the processing circuit is further configured to:

estimate a coverage of each of the plurality of transmission points based on at least one of the following transmission point characteristics: a carrier frequency, a maximum transmission power, an antenna height, or a path loss; and set the value of the second attribute based on the estimated coverage and on an antenna position for each of the plurality of transmission points.

12. The first radio base station according to claim 7, wherein at least one of the plurality of transmission points is configured to be managed by a second radio base station, wherein the first radio base station further comprises a communication interface to the second radio base station, and wherein the processing interface is configured to set the value of the first attribute for each of the plurality of transmission points by being configured to:

set the value of the first attribute for each of the plurality of transmission points managed by the first radio base station; and transmit a request to the second radio base station via the communication interface to set the value of the first attribute for each of the plurality of transmission points managed by the second radio base station.

* * * * *